(12) United States Patent
Docters van Leeuwen

(10) Patent No.: US 8,365,436 B2
(45) Date of Patent: Feb. 5, 2013

(54) SYSTEM AND METHOD FOR DRYING A WATER-CONTAINING SUBSTANCE

(75) Inventor: Gijsbert Docters van Leeuwen, Heythuysen (NL)

(73) Assignee: Leudal Holding B.V. (NL)

( * ) Notice: Subject to any disclaimer, the term of this patent is extended or adjusted under 35 U.S.C. 154(b) by 517 days.

(21) Appl. No.: 12/663,227

(22) PCT Filed: Jun. 3, 2008

(86) PCT No.: PCT/NL2008/050344
§ 371 (c)(1),
(2), (4) Date: May 7, 2010

(87) PCT Pub. No.: WO2008/150161

PCT Pub. Date: Dec. 11, 2008

(65) Prior Publication Data
US 2011/0041357 A1 Feb. 24, 2011

(30) Foreign Application Priority Data
Jun. 4, 2007 (NL) .................................... 2000680

(51) Int. Cl.
*F26B 21/06* (2006.01)
(52) U.S. Cl. .............. 34/467; 34/72; 165/10; 62/304; 463/168; 166/68
(58) Field of Classification Search .............. 34/381, 34/413, 467, 497, 60, 68, 72, 75, 90; 165/10, 165/66, 60, 108; 126/634; 62/99, 304; 423/212, 423/168, 182; 166/68, 602, 401
See application file for complete search history.

(56) References Cited

U.S. PATENT DOCUMENTS

| | | | | |
|---|---|---|---|---|
| 2,304,243 A * | 12/1942 | Crawford | ...................... | 165/210 |
| 2,422,536 A * | 6/1947 | Finnegan | ........................... | 34/77 |
| 3,250,315 A * | 5/1966 | Osborne et al. | ............... | 165/120 |
| 3,556,202 A * | 1/1971 | Stockford et al. | .............. | 165/66 |
| 3,913,661 A * | 10/1975 | Burg et al. | ..................... | 165/222 |
| 3,926,249 A * | 12/1975 | Glancy | .......................... | 165/299 |
| 4,182,406 A * | 1/1980 | Holbrook et al. | ............ | 165/48.2 |
| 5,123,481 A * | 6/1992 | Albers et al. | .................. | 165/111 |
| 5,134,944 A * | 8/1992 | Keller et al. | .................. | 110/234 |

(Continued)

FOREIGN PATENT DOCUMENTS

DE    3227896 A1 *    1/1984
DE    196 54 093        6/1998

(Continued)

*Primary Examiner* — Stephen M. Gravini
(74) *Attorney, Agent, or Firm* — Fliesler Meyer LLP

(57) ABSTRACT

Method and device for drying a water-containing substance using an air stream by:
 heating the air stream in a first heat exchanger (1) by direct contact between the air stream and a first portion of the water-containing substance;
 separating the heated air stream into a first and a second air stream;
 heating the second air stream in a heating unit (3);
 drying a second portion of the water-containing substance in a drying unit (5) by direct contact between the heated second air stream and the second portion of the water-containing substance;
 cooling the second air stream to the temperature level of the first cooling liquid in a second heat exchanger (201*a*) using a first cooling liquid;
 mixing the cooled second air stream and the first air stream in a mixing unit;
 cooling the mixed air stream by means of a second cooling liquid in a third heat exchanger (201*b*).

21 Claims, 8 Drawing Sheets

U.S. PATENT DOCUMENTS

Figure 1:
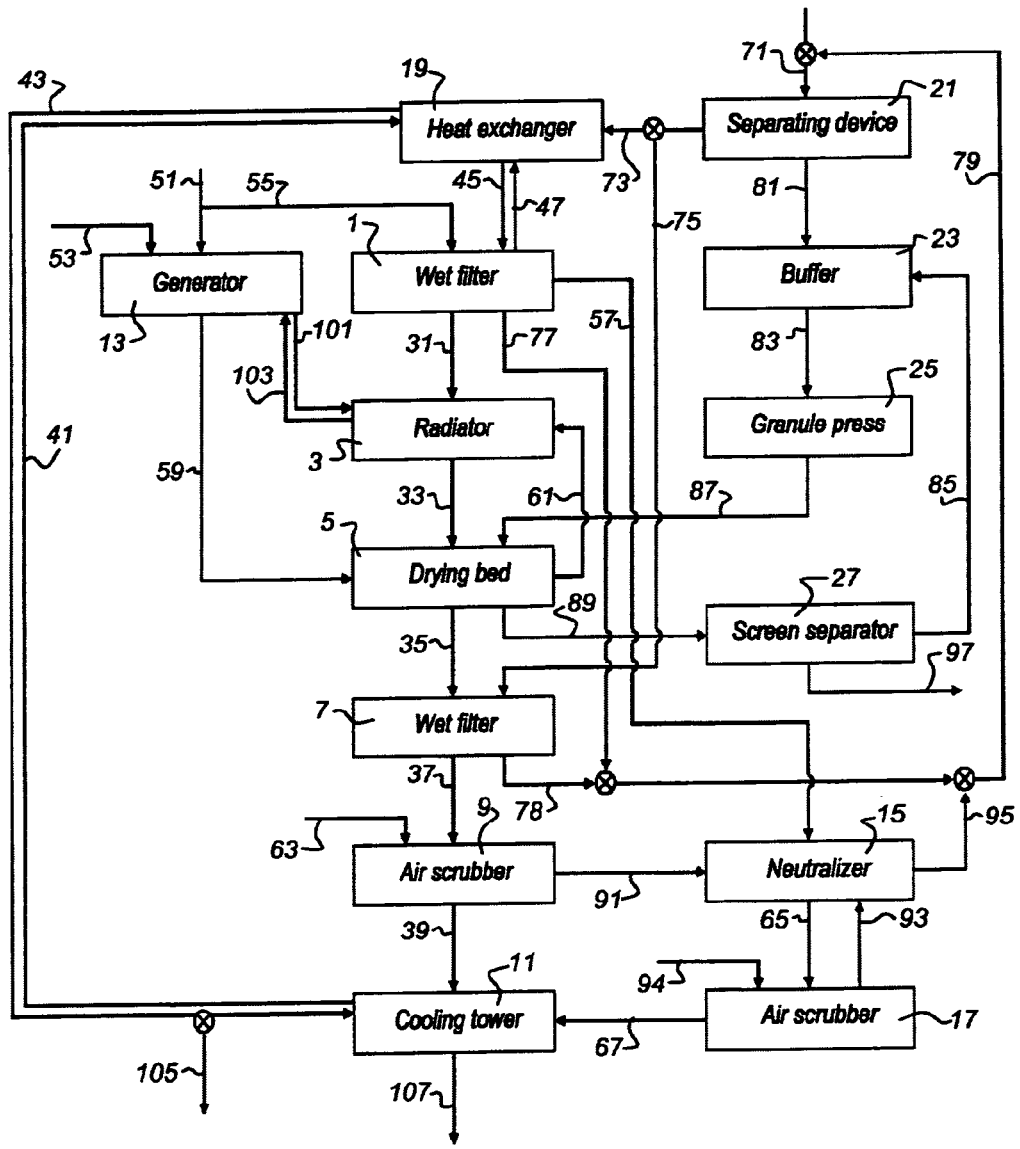

| | | | |
|---|---|---|---|
| 5,813,135 A * | 9/1998 | Michie et al. | 34/381 |
| 6,213,200 B1 * | 4/2001 | Carter et al. | 165/285 |
| 6,523,604 B1 * | 2/2003 | Brooks et al. | 165/110 |
| 6,808,693 B2 * | 10/2004 | Arnaud et al. | 423/212 |
| 7,654,307 B2 * | 2/2010 | Bhatti et al. | 165/42 |
| 2006/0179676 A1 * | 8/2006 | Goldberg et al. | 34/77 |
| 2008/0047686 A1 * | 2/2008 | Reinders et al. | 165/60 |
| 2008/0201980 A1 * | 8/2008 | Bullinger et al. | 34/493 |
| 2010/0115786 A1 * | 5/2010 | Docters Van Leeuwen | 34/381 |
| 2011/0041357 A1 * | 2/2011 | Docters Van Leeuwen | 34/467 |

FOREIGN PATENT DOCUMENTS

| | | | |
|---|---|---|---|
| GB | 2 052 708 | | 1/1981 |
| JP | 60133662 A | * | 7/1985 |
| JP | 06222196 A | * | 8/1994 |
| WO | 01/56715 | | 8/2001 |
| WO | WO 2008150161 A1 | * | 12/2008 |

* cited by examiner

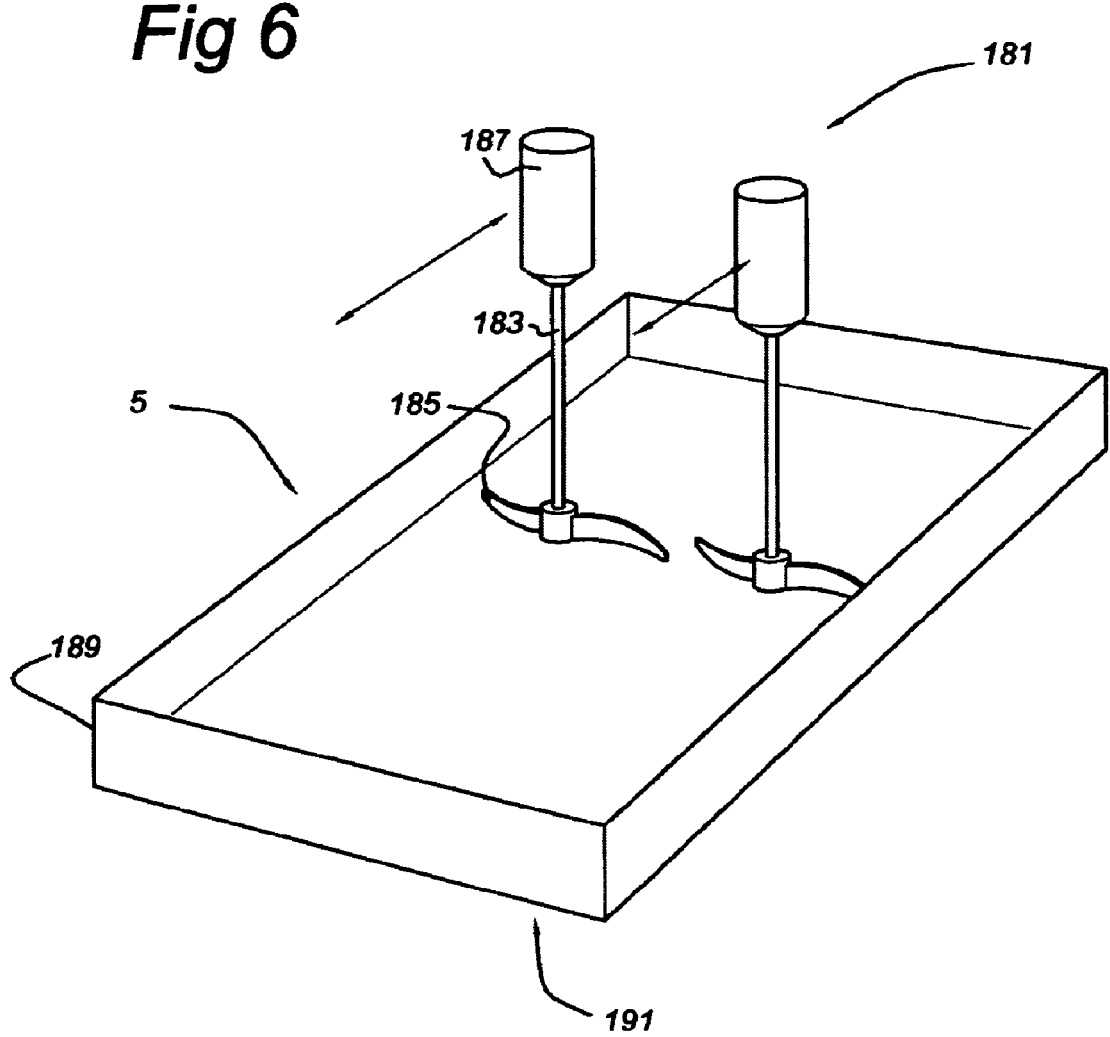

SYSTEM AND METHOD FOR DRYING A WATER-CONTAINING SUBSTANCE

The invention relates to a system and method for drying a water-containing substance, such as manure.

Pig manure slurry is a substantially aqueous by-product of intensive pig farming, typically having a solids content of 3-10%. An average porker produces one cubic metre of manure slurry annually and an average sow with piglets five cubic metres. The transportation of manure slurry is mainly the transportation of water and is therefore expensive. There is thus a need for a cost-effective method for reducing the amount of water in manure slurry. It is an object of the invention to provide a system and method in order to dry a water-containing substance, such as manure slurry, using a minimum of energy. In addition, it is an object of the invention to provide a system and a method to recover (residual) heat in an efficient manner and to subsequently re-use the latter.

To this end, the invention provides a system for drying a water-containing substance by means of an air stream, as defined in claim 1.

In one embodiment, the invention provides a method for drying a water-containing substance by means of an air stream, as defined in claim 20.

This system and this method result in a high efficiency as the latent heat which is released (condensation energy) can be used elsewhere in the process at virtually the same temperature for evaporating water from the water-containing substance.

The system provides a "closed" heat circuit, in which residual heat of a relatively low temperature is recovered and re-used in the first wet filter. In order to recover and re-use residual heat in a cost-effective manner, a temperature difference of at least 10° C. has to be maintained between the second air stream coming from the drying unit and saturated to a second level, and the first portion of the water-containing substance. If the temperature difference is lower, the heat losses are so great that recovery and re-use are no longer viable. In order to achieve such a temperature difference, the air coming from the drying bed has to be saturated at as high a temperature level as possible, which can only be achieved by heating a limited amount of air using the heating unit. This results in the heated air stream which is saturated to a second level, which in turn results in the heated first cooling liquid in the second heat exchanger. The heated first cooling liquid has a temperature level which is such that it can, if desired, be used later on in a fourth heat exchanger for heating the first portion of the water-containing substance. This can subsequently be used to heat the air through the first wet filter directly.

The cooled second air stream, coming from the second heat exchanger, still contains an amount of residual heat, which is similar to the residual heat in a first portion of the air stream, which first portion is, for example, passed to a neutralizing device and a second air scrubber via a bypass without further heating. Therefore, these two air streams can be mixed without any problem. The temperature difference between this mixed air stream and the second (coolest) cooling liquid is sufficient to extract heat from the air stream by means of direct contact and to heat the second cooling liquid therewith. The heated second cooling liquid has then become the first cooling liquid which is heated further as described above. The result thereof is that the cooling liquid reaches a temperature which is as high as possible and that as much residual heat as possible is re-used.

The invention will be described in more detail below with reference to the figures that follow by way of example. The figures are not intended to limit the scope of the invention, but only as an illustration thereof.

Figure 2:
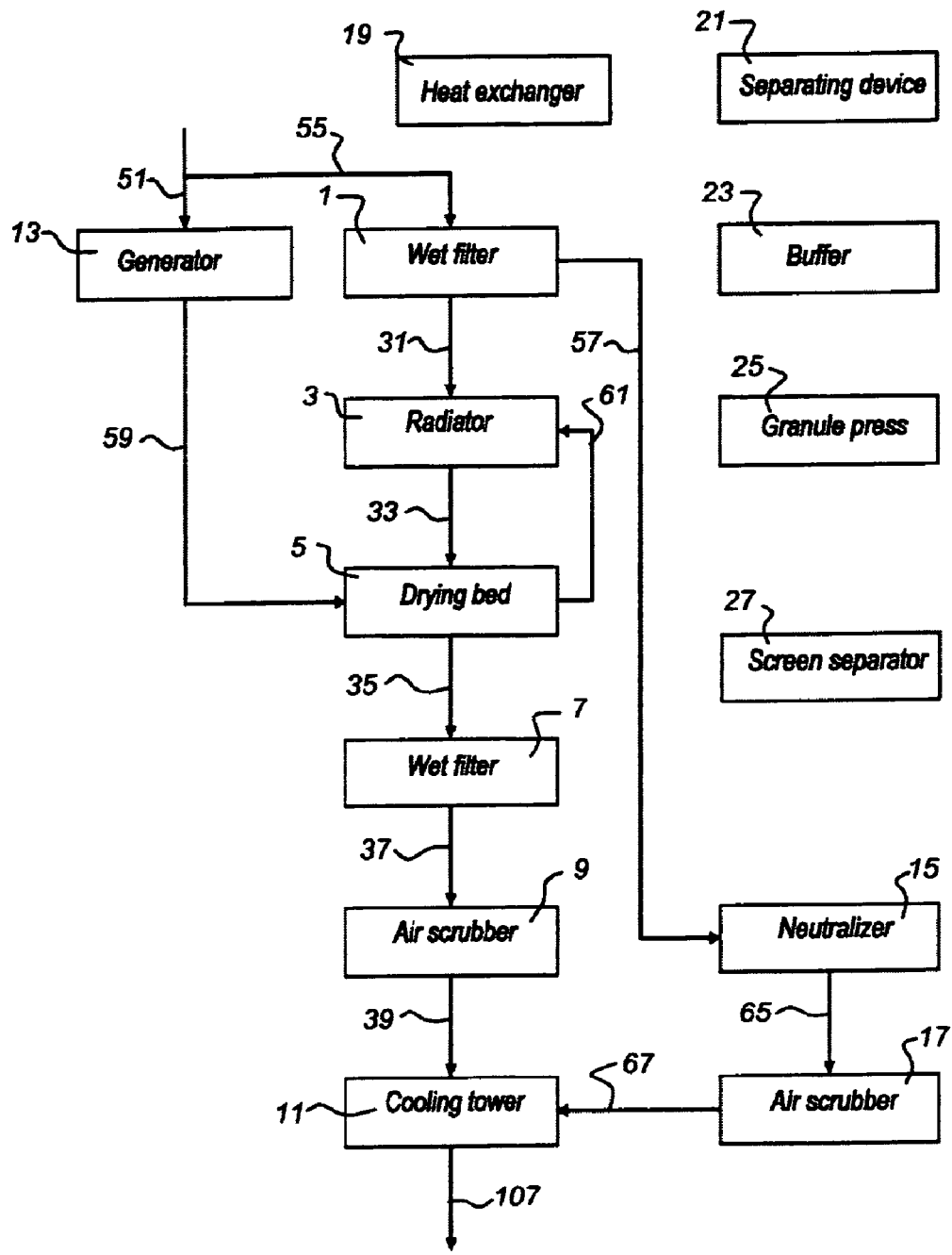
Figure 3:
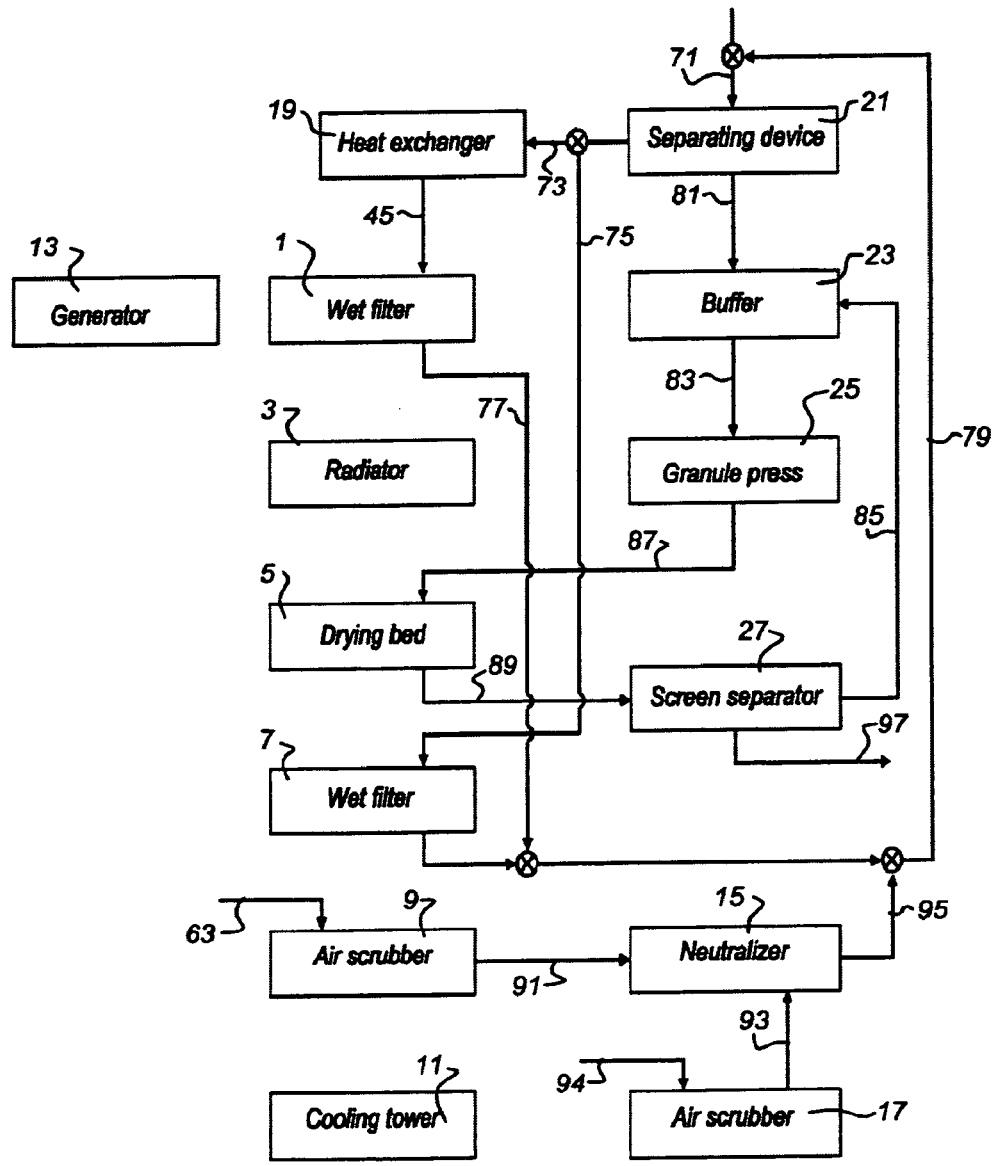
Figure 4:
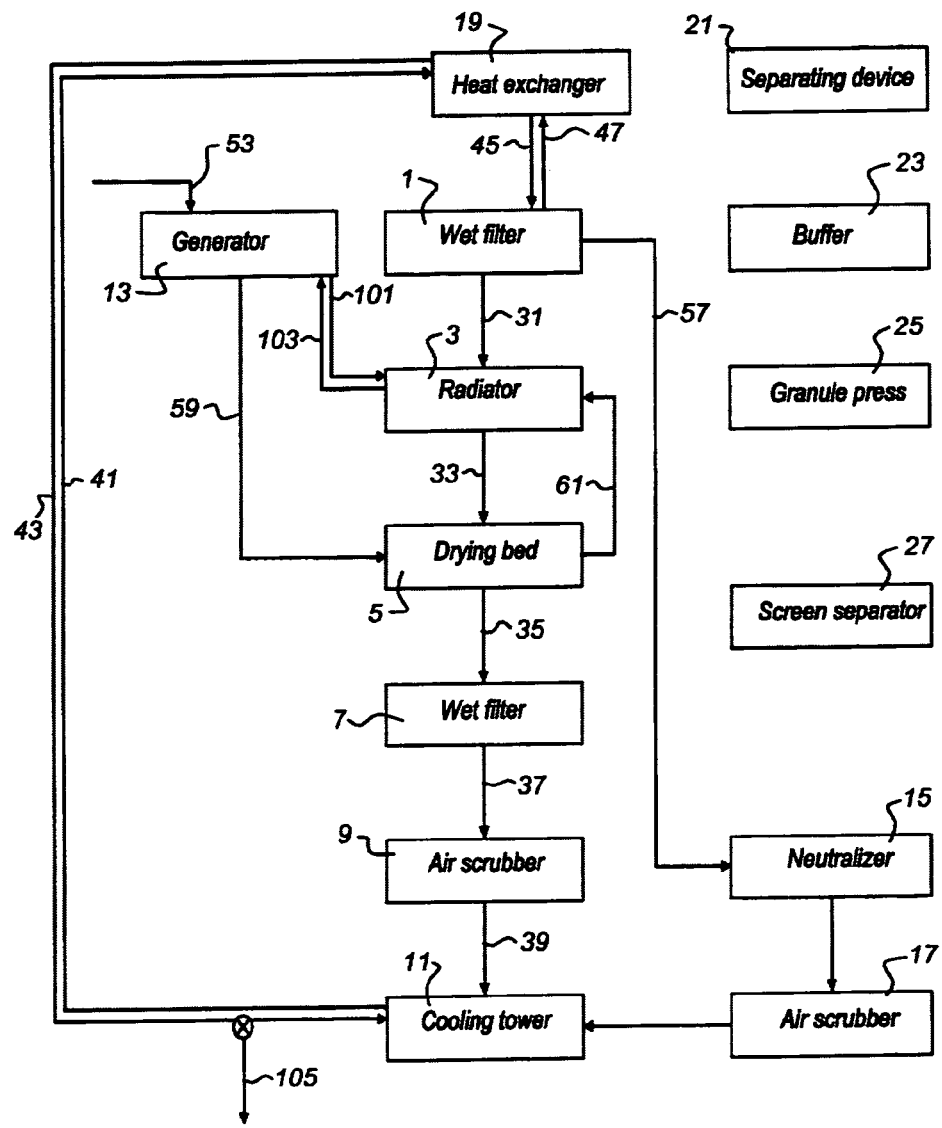
Figure 5A:
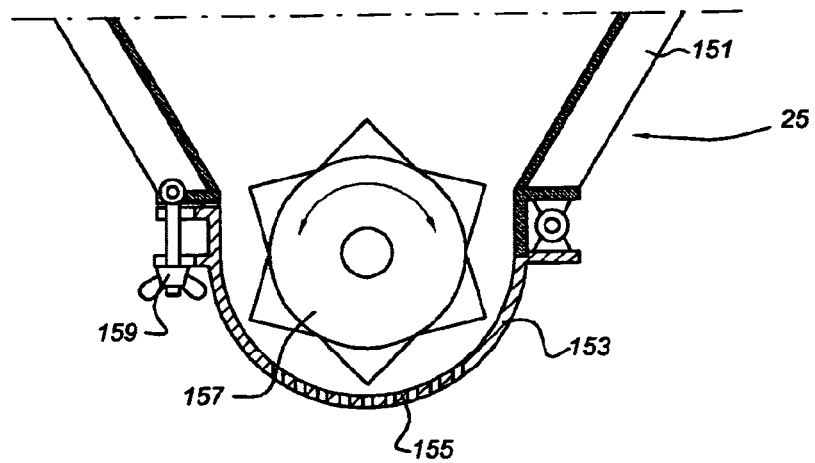
Figure 5B:
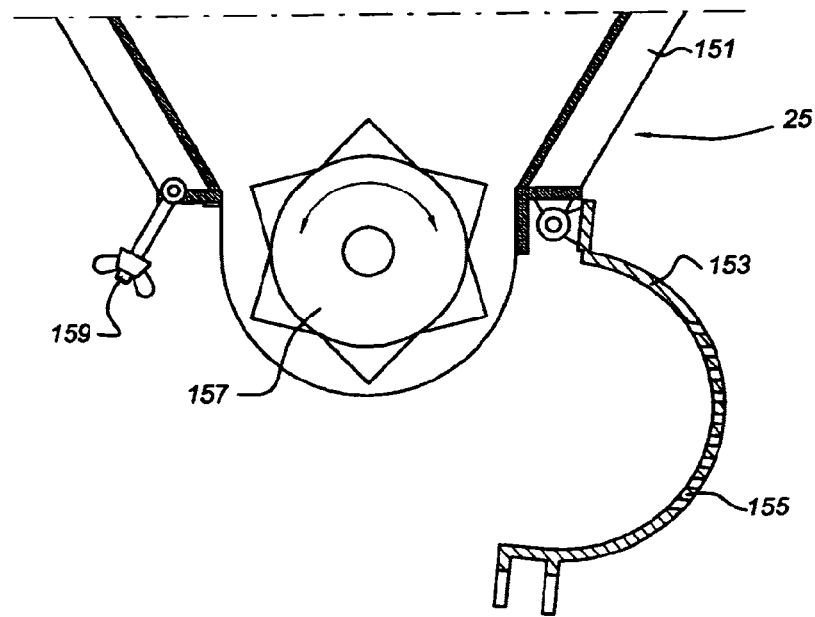
Figure 5C:
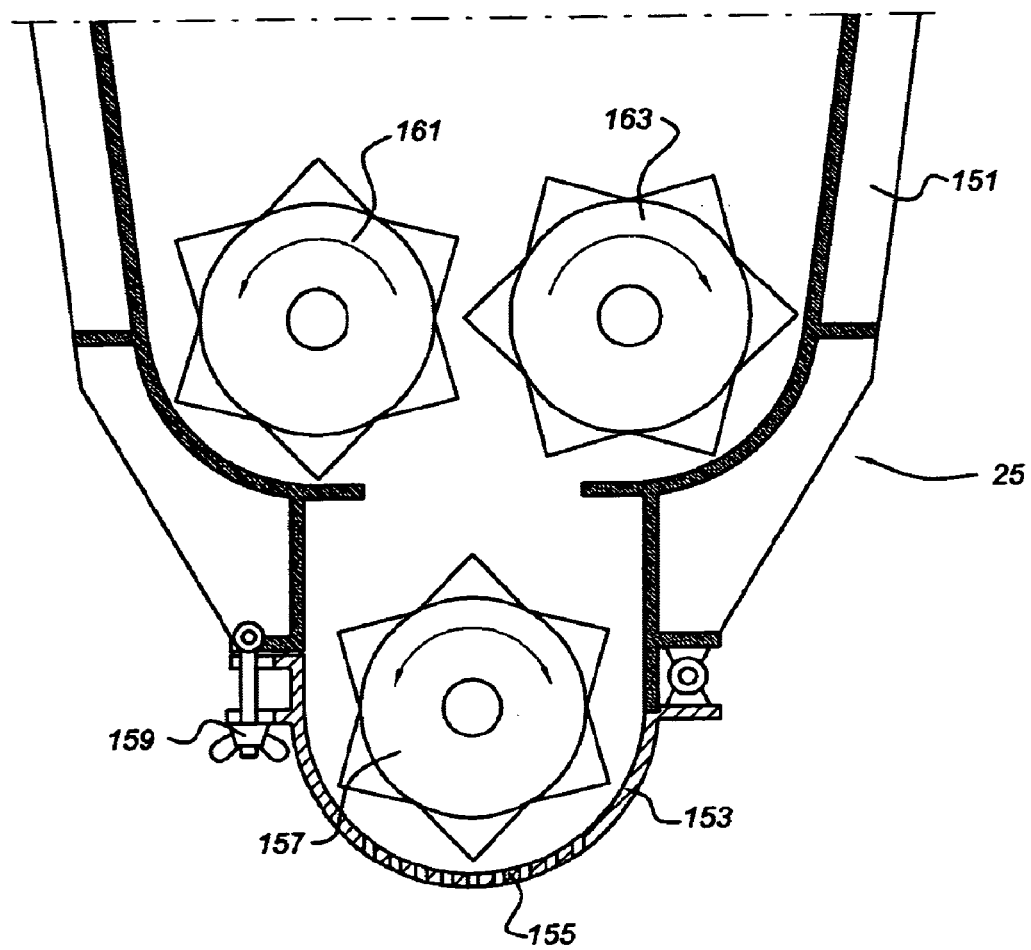
Figure 7A:
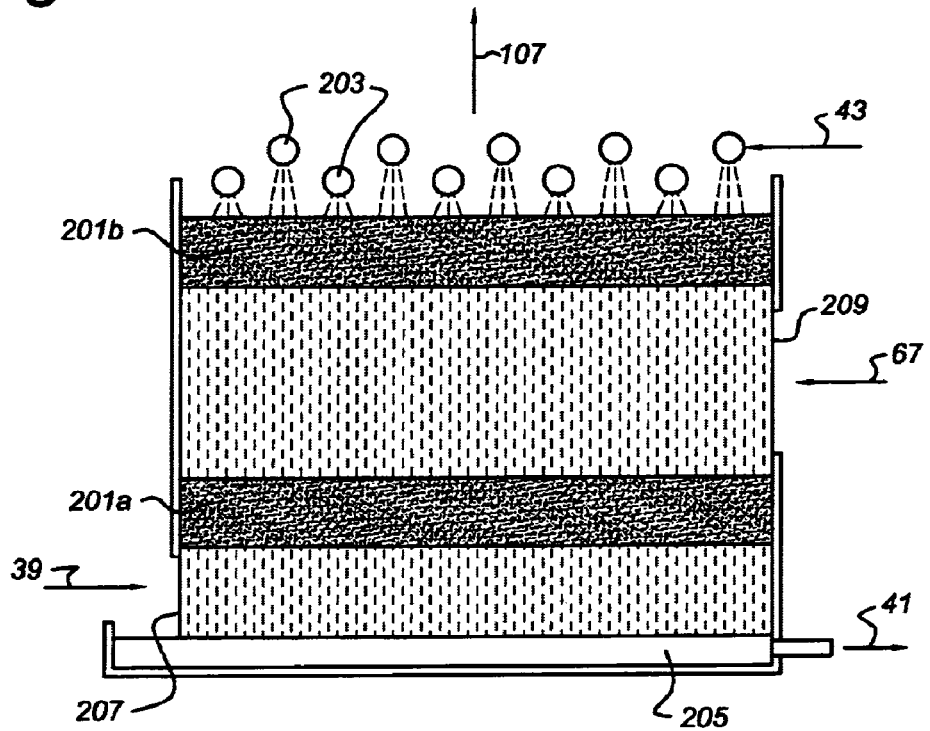
Figure 7B:
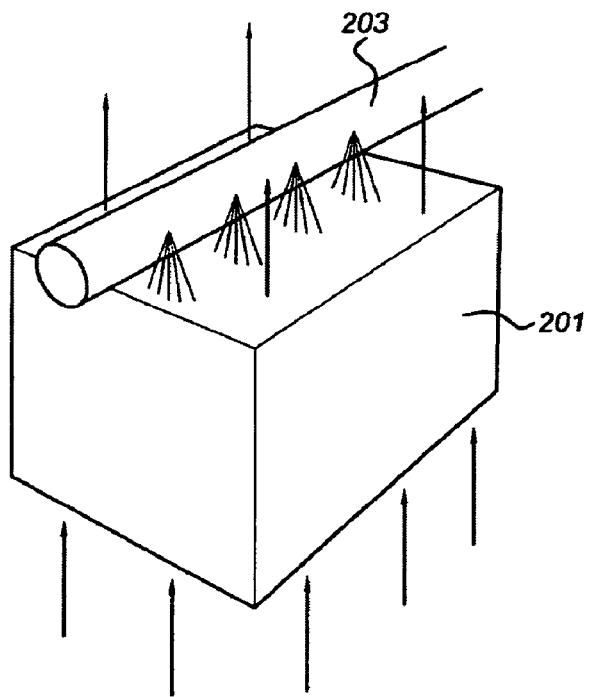

FIG. 1 diagrammatically shows an overview of an embodiment of a drying system and associated processes according to the present invention;

FIG. 2 diagrammatically shows an overview of the air streams in the drying system diagrammatically represented in FIG. 1;

FIG. 3 diagrammatically shows an overview of the mineral streams in the drying system diagrammatically represented in FIG. 1;

FIG. 4 diagrammatically shows an overview of the energy streams in the drying system diagrammatically represented in FIG. 1;

FIG. 5*a* shows a diagrammatic cross section through a single pressing device which can be used in embodiments of the present invention;

FIG. 5*b* shows a diagrammatic cross section through the pressing device from FIG. 5*a* with an open underside;

FIG. 5*c* shows a diagrammatic cross section of a multiple pressing device which can be used in embodiments of the present invention;

FIG. 6 shows a diagrammatic drawing of a loosening device which can be used in embodiments of the present invention;

FIG. 7*a* shows a diagrammatic cross section of a multiple air-cooling device which can be used in embodiments of the present invention; and FIG. 7*b* shows a diagrammatic drawing of a detail of a wet filter, which also acts as a neutralizing device and air-cooling device according to FIG. 7*a*.

The invention is described in the description below by way of example with reference to drying manure. However, it should be understood that the embodiments described, both with regard to the system and the method, can also be used for drying other water-containing substances, such as dredge spoil, mud from treatment plants, or residue streams coming from fermentation plants or from food processing.

FIG. 1 shows a diagrammatic overview of an embodiment of a drying system and associated processes according to the present invention. The drying system comprises a first wet filter 1, a radiator 3, a drying bed 5, a second wet filter 7, a first air scrubber 9 and a cooling tower 11. All the abovementioned parts are connected to one another in such a manner that air from the first wet filter 1 can flow to the radiator 3 via line 31, from the radiator 3 to the drying bed 5 via line 33, from the drying bed 5 to the second wet filter 7 via line 35, from the second wet filter 7 to the first air scrubber 9 via line 37 and from the first air scrubber 9 to the cooling tower 11 via line 39. Specific aspects of the abovementioned air stream are discussed with reference to FIG. 2. The embodiment of the drying system illustrated in FIG. 1 furthermore comprises a generator 13, a neutralizing device 15 and a second air scrubber 17. The functions of these elements and the connections between them are discussed with reference to FIG. 2.

The embodiment of the drying system illustrated in FIG. 1 furthermore comprises a heat exchanger 19. The heat exchanger 19 is in communication with the cooling tower 11 via lines 41 and 43 and with the first wet filter 1 via lines 45 and 47. The position and function of the heat exchanger 19 in the drying system is explained in more detail with reference to FIGS. 3 and 4.

Finally, the embodiment of the drying system illustrated FIG. 1 furthermore comprises a separating device 21, a buffer 23, a pressing device 25 and a screen separator 27. These elements are used for processing mineral streams in the drying system. Connections between these elements and other elements in the drying system and the functions of the various parts will be described in more detail with reference to FIG. 4.

FIG. 2 shows a diagrammatic overview of air streams in the drying system as illustrated diagrammatically in FIG. 1. Ambient air is drawn in by the generator 13 via line 51. Furthermore, ambient air can be drawn in at various locations in the drying system by means of ventilating fans (not shown). The generator 13 uses an amount of air to convert fuel, which is supplied via line 53 (illustrated in FIG. 1), into useful energy, for example in the form of electrical energy or heat. Preferably, the generator 13 is a combined heat and power (CHP) installation, which, in addition to electrical energy, also supplies an amount of residual heat. The residual heat can be used in various locations in the drying system. Other possible sources of heat which can serve as a source for the radiator 3 instead of generator 13 are biomass, animal heat and a solar collector.

In addition to the ambient air which is supplied to the generator 13, an amount of ambient air is also, by means of, for example, a ventilator (not shown), supplied via line 55 to the first wet filter 1 and passed through it. In the first wet filter 1, the air stream is brought into intimate contact with a thin watery manure fraction, referred to below as thin manure fraction. A more detailed description of the expression thin manure fraction is given in the description of FIG. 3. As a result of the intimate contact, the air will absorb moisture and volatile constituents, such as ammonia, from the thin manure fraction and become saturated with these to a certain degree. A degree of saturation of 95% relative atmospheric humidity or more can easily be achieved, but the invention is not limited thereto. In addition, the air is heated by the hotter manure fraction and thus acts as a heat exchanger.

The air coming out of the first wet filter 1 can be separated into a first portion which is passed to neutralizing device 15 via line 57, which acts as a bypass, and a second portion which is passed to the radiator 3 via line 31 and from there to the drying bed 5 via line 33. The function of the bypass 57 will be explained later. First, the air stream associated with the second portion of the air stream will be discussed. Flue gases originating from the generator 13 can also be mixed into this second portion of the air stream via line 59 which is present between the generator 13 and drying bed 5. The temperature of the air stream will rise as a result of passing along the radiator 3, and if flue gases are added via line 59, as a result of this addition. In the drying bed 5, the air will absorb moisture and volatile constituents, such as ammonia, and become saturated with them to a certain degree, for example up to a level of 85% relative humidity or more. However, the invention is not limited hereto.

As a result of the air passing through the drying bed 5, the temperature of the air will decrease. A portion of the air coming out of the drying bed 5 can be returned to the radiator 3 via line 61, so that heat can be supplied to it again, thus resulting in a recirculation process. The drying system may be designed in such a manner that the recirculation process can be repeated several times, which increases the efficiency of the drying system. A portion of the air coming out of the drying bed 5 which is not introduced into the recirculation process via line 61 is passed through the second wet filter 7 via line 35. In the second wet filter 7, the air stream is brought into intimate contact with the thin manure fraction in order to remove solid particles carried along by the air stream and furthermore in order to saturate the air stream with moisture. Subsequently, the air stream is fed to the first air scrubber 9 via line 37. In the first air scrubber 9, the ammonia present in the air is removed from the air stream via intimate contact with a highly acidic solution, which has a pH, for example, in the range of 2.0-2.5 and can be supplied via line 63 (illustrated in FIG. 1). The acidic solution which is supplied via line 63 may comprise sulphuric acid. Finally, the air stream is fed from the first air scrubber 9 to the cooling tower 11 via line 39.

Air which is passed via the bypass 57 from the first wet filter 1 to the neutralizing device 15 is brought into intimate contact in the neutralizing device 15 with acidic drain water coming from the first air scrubber 1 via a line 91 and second air scrubber 17 via a line 93. The purpose thereof is to neutralize any acid which is still present in the drain water. A part of the ammonia present in the air stream will also be collected in the neutralizing device 15. From the neutralizing device 15, the air stream is fed to the second air scrubber 17 via line 65. In the second air scrubber 17, the air is brought into intimate contact with a highly acidic solution, for example having a pH in the range from 2.0-2.5, in a manner similar to that described with regard to the first air scrubber 1 in order to remove the remaining ammonia. This highly acidic solution is fed to the second air scrubber 17 via line 94. The air coming out of the second air scrubber 17 is saturated and is fed to the cooling tower 11 via line 67.

In the cooling tower 11, saturated air coming from the first air scrubber 1 is mixed with saturated air coming from the second air scrubber 17. Saturated air is removed from the cooling tower 11 via line 107. In addition, both air streams are cooled, during which process water of condensation is formed. A possible embodiment of the cooling tower 11 is described with reference to FIG. 7a.

FIG. 3 shows a diagrammatic overview of mineral streams in the drying system as illustrated diagrammatically in FIG. 1. Raw manure coming from a storage tank (not shown), for example via line 71, is separated in a separating device 21 into a thin manure fraction having a relatively large volume, that is to say a manure fraction having a solids content of for example 2-3%, and a thick manure fraction having a relatively small volume, that is to say a manure fraction having a solids content of, for example, 15-35%. The separating device 21 may contain one or more components from the group comprising screening bend, drum separator and centrifuge.

The thin manure fraction is fed to the first wet filter 1 and the second wet filter 7 via line 73 and line 75, respectively. In said wet filters 1, 7, the thin manure fraction is brought into intimate contact with ambient air (first wet filter 1) and air coming from the drying bed (second wet filter 7), respectively. Through evaporation, the thin manure fraction loses moisture to the air during this contact, as has already been described above. As a result thereof, the thin fraction is thickened up to a maximum solids content of approx. 15%. The fraction thickened by the first wet filter 1 and second wet filter 7, respectively, leaves the first wet filter 1 and second wet filter 7, respectively, via a line 77 and line 78, respectively, which, if desired, converge in a line 79.

The fraction which has been thickened in this manner can then be returned to the storage tank for raw manure via lines 77, 78, 79 or, as is illustrated in FIGS. 1 and 3, be added to the supply of raw manure to the separating device 21 via line 71. As a result of the "sticky" nature of the thickened fraction, the latter will adhere to the solid particles present in the fresh raw manure when it is mixed with the latter. This results in a separable thick fraction, which can be separated off by means of the separating device 21. In one embodiment of the drying system, the thickened fraction is not fed to the separating device 21, but added directly (not shown) to the thick fraction, which leaves the separating device 21 via line 81. However, there is then a risk that the solids content of the thick fraction will become too low for the intended further treatment, a more detailed explanation of which will be given below.

Following separation in the separating device 21, the thick manure fraction is passed to the buffer 23 via line 81. In the buffer 23, the thick manure fraction is mixed with fine manure material, such as fine particles, which is supplied from the screen separator 27 via line 85, and results in a mixed thick manure fraction. The mixed thick manure fraction is fed from the buffer 23 to the pressing device 25 via line 83. Possible embodiments of such a pressing device 25 will be described with reference to FIGS. 5*a* to 5*c*.

By means of the pressing device 25, manure elements, for example in the shape of pressed wet manure strings and rod-shaped manure elements, also referred to as "wet granules", can be deposited on drying bed 5. This is carried out by means of a line 87 between pressing device 25 and drying bed 5 which line 87 is illustrated in FIG. 3. On the drying bed 5, the deposited manure elements form a manure package for drying. As soon as the manure elements in the manure packet have been dried to a solids content of at least 85%, they are detached from the drying bed 5. This is preferably carried out by means of a loosening device, as illustrated and described with reference to FIG. 6. The loosened dry manure elements end up in a conveying duct (not shown), from which they are passed to a screen separator 27 by conveying means via line 89. Subsequently, they are passed to a storage facility (not shown). The conveying means may comprise a screw jack, which may be situated in a semi-open or closed tube. The screen separator 27 is designed to separate coarse and fine manure material from one another. The screen separator 27 may be in the form of a tube provided with a fine gauze in order to separate off fine matter, for example fine particles, in the tube. FIG. 3 illustrates how the fine material which has been separated off in the screen separator 27, such as fine particles, can be returned to the buffer 23 via line 85 in order to be mixed there with the thick fraction coming from the separating device 21. Granular manure is discharged from the screen separator 27 via line 97.

In addition to a mineral-containing part-stream of thin manure fraction and a mineral-containing part-stream of thick manure fraction, both of which have been described above, there is also a third mineral-containing part-stream present in the embodiments of the drying system according to the present invention. Said third mineral-containing part-stream is formed by ammonia which is removed from the air by means of the first air scrubber 1 and the second air scrubber 7 in a manner as described with reference to FIG. 2. A possible embodiment of a first air scrubber 1 and/or second air scrubber is described in detail with reference to FIG. 7*b*.

As is illustrated in FIG. 3, the so-called scrubbing process takes place in two air scrubbers, that is to say first air scrubber 9 and second air scrubber 17. As soon as a certain amount of ammonia has dissolved in the highly acidic solution in air scrubber 9 or air scrubber 17, which substantially corresponds to the solubility of the ammonium salt formed, the supply of acid solution to said air scrubber is discontinued. Acid drain water which originates from the first air scrubber 9 and the second air scrubber 17 is then supplied to neutralizing device 15 via line 91 and line 93, respectively. As a result of ammonia being taken up, the highly acidic solution will be neutralized, as a result of which said solution will reach a pH of 8.5-9.0 in a relatively short time. In one embodiment of the drying system, which is not illustrated in FIG. 3, a second neutralizing device is additionally provided between the second wet filter 7 and the first air scrubber 9.

The advantage of neutralization in a separate neutralizing device, such as neutralizing device 15, is that no neutralization has to take place in the first air scrubber 9 and/or second air scrubber 17 themselves/itself. This makes it possible to keep both the first air scrubber 9 and the second air scrubber 17 at a continuously low pH and to achieve a relatively high constant efficiency of 95-98% removal of ammonia from the air. A neutralized watery solution coming from the neutralizing device 15 may be discharged, be returned to a storage facility for raw manure or, as is illustrated in FIG. 3, be added via line 95 to the manure stream of thickened manure fraction which is supplied to the separating device 21 via line 79. This has the advantage that the acid does not cause any corrosion.

The end result of the abovementioned mineral-containing part-streams is that there is one starting product, i.e. raw manure which is fed to the separating device 21 via line 71, and one end product, i.e. dried manure elements, or "granular manure", discharged from the screen separator 27 via line 97. In FIG. 3, the raw manure is supplied via line 71 and the granular manure is discharged via line 97.

FIG. 4 shows a diagrammatic overview of energy streams in the drying system as illustrated diagrammatically in FIG. 1. The generator 13 acts as the heat supply for the drying process. Preferably, the generator 13 is a CHP installation which, through the combustion of a fuel which can be supplied via line 53, generates a relatively constant amount of residual heat, in addition to electricity. The abovementioned combustion releases hot flue gases. In addition, the generator 13 is cooled with water. Cooling water which has absorbed heat in the generator 13 can be supplied to the radiator 3 via line 101. In the radiator 3, said cooling water gives off its absorbed heat to a relatively cool and saturated air stream via line 31 coming from the first wet filter 1. This results in the air stream being heated up and the water being cooled down. The cooled water can be returned from the radiator 3 to the generator 13 via line 103 in order to be used as cooling water once again. The heated air from radiator 3 can be mixed with a portion of the hot flue gases, which can be passed directly to the drying bed 5 via line 59. However, it is preferred to mix all of the flue gases with the heated air from radiator 3 before they enter the drying bed 5 and only then to pass the mixed air through the drying bed via line 33, as the flue gases are always hotter than the radiator 3. Other possible sources of heat which may serve as generator 13 are sustainable sources, such as biomass, animal heat and a solar collector.

As has been described above with reference to FIG. 2, a portion of the air emerging from the drying bed 5 via line 61, that is to say a recirculation circuit, is returned to the radiator 3. In the radiator 3, said air can be heated again, be injected with hot flue gases again, and subsequently be passed through the drying bed 5 again. In this manner, the efficiency of the drying process can be significantly increased as the air stream will reach a higher temperature in the saturated state than would be possible without the recirculation circuit. Using the recirculation circuit, it has been found that it is possible to evaporate approximately 1000 liters of water per hour with a thermal power of 1000 kW.

In addition, it is possible, by extracting heat from the hot air coming from the drying bed 5 and saturated by the second wet filter 7 and first air scrubber 9 and subsequently returning the extracted heat back to the heat exchanger 19, to increase the efficiency of the drying process significantly. An effective way of extracting heat from the hot saturated air stream is the use of a cooling tower 11. A possible embodiment of such a cooling tower 11 will be described with reference to FIG. 7*a*.

As has just been described, water heated in the cooling tower 11, including water of condensation, can be supplied to the heat exchanger 19 via line 41. The heat exchanger 19 may be a tube heat exchanger or a plate heat exchanger, in which the thin manure fraction is heated before being supplied to the first wet filter 1 in a recirculation process via line 45 in order to heat the ambient air which has also been supplied thereto, as described with reference to FIGS. 2 and 3. Following cooling through heat transfer and evaporation, the thin manure fraction from the first wet filter 1 can be returned again to the heat exchanger 19 via line 47. By heating the thin manure fraction in a heat exchanger 19 and thus bringing the ambient air into direct contact with this heated manure fraction, heat is transferred in a very effective manner.

In the heat exchanger 19, the mixture of cooling water and water of condensation coming from the cooling tower 11 cools down. This cooled water of condensation can be drawn off from heat exchanger 19 via line 43 and subsequently via 105, as a result of which heat losses via water of condensation are reduced to a minimum. Some of the cooled water of condensation may also be discharged to cooling tower 11 via line 43.

Below, possible embodiments of a few parts of the drying system as described with reference to FIGS. 1 to 4 are described in more detail.

FIG. 5*a* shows a diagrammatic cross section of an embodiment of pressing device 25. FIG. 5*b* shows a diagrammatic cross section of the pressing device 25 from FIG. 5*a* with an open underside. The pressing device 25 is a single pressing device which comprises a storage container 151 which is provided with a dish 153 which is reclosable on the underside. It is not obligatory to use a reclosable dish 153 of this type, but it has proven very useful in practice. The dish may be elongate and half-round, as is illustrated in FIGS. 5*a* to 5*c*. The underside of the dish 153 is provided with apertures 155 along its entire length and preferably at regular intervals. An elongate gear wheel 157 is provided in the half-round dish. The gear wheel 157 is designed to be able to rotate freely about a rotation shaft, both in a first direction of rotation, for example counter-clockwise, and in a second direction of rotation, for example clockwise. The expression rotate freely is intended to mean that the dish 153 is not touched during rotation. The rotation shaft of the gear wheel 157 can be driven by driving means, such as an electric motor, in a manner well known to the person skilled in the art. By rotating the gear wheel 157 alternately in the first direction of rotation and subsequently in the second direction of rotation, for example initially counter-clockwise and then clockwise, a thick manure fraction can be pressed through the apertures 155. In addition, this prevents hairs and the like which are present in the thick manure fraction from aligning with a direction of rotation of the gear wheel 157 which could result in the apertures 155 becoming blocked. If the gear wheel 157 is nevertheless blocked by, for example, a relatively large, hard object, such as a stone, the latter can easily be removed by opening the reclosable dish 153. In the embodiment illustrated in FIGS. 5*a* and 5*b*, the dish is reclosable by virtue of a retaining nut 159. If, for example, a stone has to be removed, the reclosable dish 153 can be opened in a simple manner by releasing the retaining nut 159, as is illustrated in FIG. 5*b*. After the stone has been removed, the reclosable dish can be closed again by fastening the retaining nut 159 again. It should be understood that there are many other ways of making the dish 153 reclosable in addition to the illustrated bolt/nut combination with the retaining nut 159, which the person skilled in the art will be aware of.

FIG. 5*c* shows a diagrammatic cross section of another embodiment of pressing device 25. This embodiment of the pressing device 25 relates to a multiple pressing device. Such a multiple pressing device is particularly suitable for a thick manure fraction with a relatively high solids content, for example >30%. In the multiple pressing device illustrated in FIG. 5*c*, above the gear wheel 157 in the reclosable dish 153 with apertures 155, which closes off the underside of a storage container 151, two elongate gear wheels 161, 163 which extend parallel thereto are provided. The two gear wheels 161, 163 are designed to rotate about a respective rotation shaft in opposite directions of rotation. As a result of the two gear wheels 161, 163 rotating simultaneously, the pressure at the bottom of the pressing device 25 is increased. The increased pressure makes it possible for the gear wheel 157 in the reclosable dish 153 to press the thick manure fraction through the apertures 155, even if is has a relatively high solids content.

In one embodiment of the pressing devices as illustrated in FIGS. 5*a* to 5*c*, the apertures 155 in the reclosable dish 153 are annular apertures. In the embodiment of the pressing device 25 as illustrated in FIG. 5*c*, the storage container 151 has walls which run straight. Of course, such a pressing device may also have tapering walls, just as the embodiment of the pressing device 25 illustrated in FIGS. 5*a* and 5*b*, and vice versa.

In various embodiments, the pressing device 25 is placed on a frame provided with wheels (not shown). By means of this frame provided with wheels, the pressing device 25 can be moved to and fro across the drying bed 5. As a result thereof, pressed wet manure strings and rod-shaped manure elements can be distributed evenly across the drying bed. In one embodiment, the pressing device 25 is connected to a control module which ensures that the pressing device 25 is filled by the buffer 23 in time.

FIG. 6 shows a diagrammatic drawing of a loosening device 181 which can be used in embodiments of the drying process according to the present invention. As has been described above, the aim is to detach the manure elements from the drying bed 5 as soon as they have dried to a solids content of at least 85% in the drying bed. This can be carried out by means of a loosening device 181 as illustrated in FIG. 6. The loosening device 181 may be attached to the pressing device 25 (not shown), for example to a frame thereof provided with wheels. The loosening device 181 comprises one or more rotatable rods 183 provided with a fan-shaped element 185. The one or more rotatable rods 183 may be driven separately or jointly, for example by means of an electric motor 187.

The drying bed 5 comprises a collecting tray 189 having upright edges and a baseplate 191 provided with apertures. The apertures allow manure elements to leave the drying bed on account of the force of gravity. In addition, the apertures allow the free passage of air. Preferably, the collecting tray 189 is designed in such a manner that it is possible to move the pressing device 25, which preferably rests on one or more of the upright edges of the collecting tray 189, over the upright edge by means of wheels, which are preferably provided with a guide edge. If the wheels are provided with a guide edge, the pressing device 25 can only be moved along the upright edges of the collecting tray 189 in a parallel manner.

The one or more rotatable rods 183 of the loosening device 181 can be lowered into the drying bed 5 from the frame of the pressing device 25. Preferably, the one or more rods 183 rotate while being lowered. If the fan-shaped element 185 is situated at a level in the manure packet on the drying bed 5 where the manure has dried to a solids content of at least 85%, which will usually be close to the baseplate of the drying bed 5, the rotating rods 183 can be moved along the entire length of the drying bed 5, if the frame is a moving frame as described above. By disturbing the drying bed 5 in this manner, compacted dry manure elements are loosened from each other and these loosened dry manure elements move through holes in the baseplate of the drying bed 5 and fall into a transport duct (not shown) situated below the drying bed 5, from where they are conveyed to a storage facility (not shown) by conveying means via a screen separator 27.

In addition, the manure packet remains intact, that is to say the dry manure elements are substantially at the bottom of the drying bed and the wet manure elements are situated substantially at the top of the drying bed.

FIG. 7a shows a diagrammatic cross section of an embodiment of a multiple air-cooling device, that is to say cooling tower 11. FIG. 7b shows a diagrammatic drawing of a detail of the air-cooling device from FIG. 7a. In one embodiment, at least one of the first air scrubber 9 and second air scrubber 17 is incorporated therein. The same technical principle which is used in the cooling tower 11 can also be used in the first wet filter 1, second wet filter 7, air scrubber 9, 17 and neutralizing device 15.

The cooling tower 11 as illustrated in FIG. 7a is provided with a first and a second layer of packing material 201a, 201b. A cooling medium, in the embodiment described relatively cold water, is supplied via pipes 203 which are situated above the second layer of packing material 201b. The pipes may be provided with spraying apertures, as illustrated in FIG. 7b, by means of which the water can be distributed over the second layer of packing material 201b and flows through the latter on account of the force of gravity as a film of liquid. At the bottom of the second layer of packing material 201b, the water drips onto the first layer of packing material 201a on account of the force of gravity and likewise flows through the latter as a film of liquid. At the bottom of the first layer of packing material 201a, the water then drips into a collecting tray 205. Below the first and second layers of packing material 201a, 201b, separate inlet apertures 207, 209 for air streams of different temperatures are provided.

This cooling tower 11 does not, as is often the case, use ambient air to cool relatively hot cooling water from a process, with some of the cooling being achieved by evaporation. By contrast, the cooling tower 11 as used in embodiments of the drying system according to the present invention uses relatively cold water to extract perceptible and latent heat from a relatively hot and saturated air stream. In this case, the relatively cold water is heated and mixed with relatively hot water of condensation.

If the cooling tower 11 from FIG. 7a, which can, in principle, also be used in other configurations, is used in the drying system as described with reference to FIGS. 1 to 4, air coming from the drying bed 5 via second wet filter 7 (indicated in FIG. 2 by line 39) is supplied to the inlet aperture 207 under the first layer of packing material 201a, referred to below as first inlet aperture 207. Air coming from the bypass 57 is supplied to the inlet aperture 209 under the second layer of packing material 201b, referred to below as second inlet aperture 209, via a neutralizing device 15 and second air scrubber 17 (indicated in FIG. 2 by line 67). The air which is supplied to the second inlet aperture 209 is relatively cool and is furthermore saturated. The air which is supplied to the first inlet aperture 207 is relatively hot and likewise saturated.

If water is supplied to the cooling tower 11 in the above-described manner and passes through the two layers of packing material 201a, 201b, the relatively cold water which is supplied via pipes 203 is heated, in two stages, to a temperature which approaches the temperature of the relatively hot air stream as supplied to the first inlet aperture 207 very closely. The first layer of packing material 201a acts as a heat exchanger in which the air coming from the second wet filter 7 is cooled. Both air streams are mixed with one another in the space between the first and second packing material 201a, 201b. Subsequently, the mixed air is cooled in the second layer of packing material 201b, so that the second layer of packing material also acts as a heat exchanger. In this manner, a very efficient heat transfer is possible and it is possible to evaporate 5000-6000 liters of water per hour with a thermal power of 1000 kW.

The packing material preferably has a relatively large internal surface area. A suitable packing material may, for example, be 2H Net 150. Such a packing material results in a film of liquid distributed across the packing material which is in countercurrent or crosscurrent with the air.

A device as illustrated in FIGS. 7a and 7b can be designed in such a manner that it also acts as air scrubber, for example first air scrubber 9 and/or second air scrubber 17. In this case, the liquid which is distributed by one or more pipes 203 provided with one or more spray heads, a scrubbing liquid, such as an acid solution, for example a sulphuric acid solution. The liquid can remove ammonia from the air with the formation of dissolved ammonium sulphate, particularly if a suitable packing material as described above is used. The air scrubber described can remove ammonia from the air until the solubility of ammonium sulphate is reached, after which the liquid, which is an acid scrubbing solution, has to be drained.

The saturated air which is supplied to the cooling tower 11 may still comprise a small amount of ammonia. If desired, said ammonia can be removed using a two-stage biological filter (nitrification/denitrification) or active carbon filter. Water of condensation which can be obtained from the cooling tower 11 may contain small amounts of volatile fatty acids, such as acetic acid, propionic acid, butyric acid, valeric acid and isovaleric acid which may be removed by means of biological purification, purification by means of active carbon or by means of a separating technique, such as RO. Caustic soda or another alkali could be used as a liquid in a liquid/air contact agent in an alkaline scrubber for the removal of volatile fatty acids.

Various heat exchangers have been described in the above description: first wet filter 1, second wet filter 7, first layer of packing material 201a, second layer of packing material 201b and heat exchanger 19. Other kinds of heat exchangers than those described here, may be used. However, at the positions of the first wet filter 1, second wet filter 7, first layer of packing material 201a and second layer of packing material 201b open heat exchangers are preferably used which allow direct contact between a water-containing substance or water (cooling liquid), respectively, and air, while heat exchanger 19 is of the closed type, in which there is a physical separation between the cooling liquid and water-containing substance.

Preferably, as is illustrated in FIG. 7a, the first layer of packing material 201a and second layer of packing material 201b are combined, with all the water (or other cooling liquid) being heated by combined first and second air streams and subsequently being afterheated by the first air stream.

All heat exchangers are preferably operated according to the so-called counterflow-principle, that is to say that the flow of the relatively hot and the relatively cold streams through the heat exchangers is in opposite directions.

This system achieves a high efficiency due to the fact that the latent heat which is released (condensation energy) is used at virtually the same temperature elsewhere in the process for evaporation. The small temperature difference between evaporation and condensation is achieved, for example, by operating the heat exchangers completely in counterflow and by, in addition, using part of the water-containing substance and the water of condensation as transport medium for energy.

The above description only describes a few possible embodiments of the present invention. It is plain to see that many alternative embodiments of the invention can be conceived, all of which are within the scope of the invention. The latter is determined by the attached claims and their technical equivalents.

The invention claimed is:

1. System for drying a water-containing substance by means of an air stream, the system comprising:
   a first heat exchanger (1) for heating the air stream by direct contact between the air stream and a first portion of the water-containing substance, resulting in a heated air stream which is saturated to a first level;
   a unit for separating the heated air stream which is saturated to a first level into a first and a second air stream;
   a heating unit (3) for heating the second air stream, resulting in a heated second air stream;
   a drying unit (5) for drying a second portion of the water-containing substance by direct contact between the heated second air stream and the second portion of the water-containing substance, resulting in a heated second air stream which is saturated to a second level and a dried product;
   a second heat exchanger (201a) for cooling the heated second air stream which is saturated to a second level using a first cooling liquid, resulting in a second air stream which has essentially been cooled to the temperature level of the first cooling liquid and is saturated to a second level and a heated first cooling liquid;
   a mixing unit for mixing the second air stream cooled to the temperature level of the first cooling liquid and saturated to the second level and the first air stream, resulting in a mixed air stream;
   a third heat exchanger (201b) for cooling the mixed air stream by means of a second cooling liquid, resulting in a cooled mixed air stream saturated to a third level and a heated second cooling liquid.

2. System according to claim 1, characterized in that the first cooling liquid comprises at least a part of the heated second cooling liquid.

3. System according to claim 1, characterized in that the first level, the second level and the third level are virtually identical to a level of complete saturation.

4. System according to claim 1, characterized in that it comprises a fourth heat exchanger (19) for receiving the heated first cooling liquid and thereby heating the first portion of the water-containing substance before passing it to the first heat exchanger (1).

5. System according to claim 4, characterized in that the fourth heat exchanger (19) is of the closed type.

6. System according to claim 1, characterized in that the first heat exchanger (1), the second heat exchanger (201a) and third heat exchanger (201b) are of the open type.

7. System according to claim 1, characterized in that the second heat exchanger (201a) and third heat exchanger (201b) are incorporated in a cooling tower, in which the second heat exchanger comprises a first layer of packing material (201a) and the third heat exchanger comprises a second layer of packing material (201b) which, during operation, is arranged above the first layer of packing material (201a), in which the mixing unit comprises a space between the first and second layers of packing material (201a; 201b) and the cooling tower comprises one or more pipes (203) for supplying the cooling liquid to the upper side of the second layer of packing material, and the cooling tower has a first opening under the second heat exchanger (201a) for receiving the heated second air stream which is saturated to a second level, and a second opening for receiving the first air stream in the mixing unit.

8. System according to claim 1, characterized in that all heat exchangers are of the counterflow type.

9. System according to claim 1, characterized in that the heating unit (3) is connected to a generator (13) which produces flue gases, and the drying unit (5) is designed to receive at least part of the flue gases.

10. System according to claim 1, characterized in that a recirculation unit is arranged between the drying unit (5) and the heating unit (3) for returning at least part of the air passed through the drying bed to the heating unit (3).

11. System according to claim 1, in which the system comprises a separating device (21) which is designed for receiving the water-containing substance and separating off the first portion of the water-containing substance from the second portion of the water-containing substance, the second portion having a higher concentration of solid matter than the first portion.

12. System according to claim 1, characterized in that it comprises a wet filter (7) between the drying unit (5) and the second heat exchanger (201a).

13. System according to claim 12, characterized in that it comprises a first air scrubber (9) between the wet filter (7) and the second heat exchanger (201a).

14. System according to claim 13, characterized in that it comprises a second air scrubber (17) between the first heat exchanger (1) and the third heat exchanger (201b).

15. System according to claim 14, characterized in that the system is designed to supply, during operation, an acid into the first air scrubber (9) and into the second air scrubber (17) for neutralizing bases which are present in air coming from the wet filter (7) and in the first air stream.

16. System according to claim 14, characterized in that it comprises a neutralizing device (15) for neutralizing acid drain water coming from the first air scrubber (9) and second air scrubber (17).

17. System according to claim 1, in which the system furthermore comprises a filter device, the filter device being designed for removing one or more fatty acids from at least one of an air stream and water of condensation.

18. System according to claim 17, in which the filter device contains at least one filter from the group comprising a biological filter, active carbon filter and reverse-osmosis filter.

19. System according to claim 1, in which the water-containing substance is manure.

20. Method for drying a water-containing substance by means of an air stream, the method comprising:
   heating the air stream in a first heat exchanger (1) by direct contact between the air stream and a first portion of the water-containing substance, resulting in a heated air stream which is saturated to a first level;
   separating the heated air stream which is saturated to a first level into a first and a second air stream;
   heating the second air stream in a heating unit (3), resulting in a heated second air stream;
   drying a second portion of the water-containing substance in a drying unit (5) by direct contact between the heated second air stream and the second portion of the water-containing substance, resulting in a heated second air stream which is saturated to a second level and a dried product;
   cooling the heated second air stream which is saturated to a second level in a second heat exchanger (201a) using a first cooling liquid, resulting in a second air stream which has essentially been cooled to the temperature level of the first cooling liquid and is saturated to a second level and a heated first cooling liquid;

mixing the second air stream cooled to the temperature level of the first cooling liquid and saturated to the second level and the first air stream, resulting in a mixed air stream;

cooling the mixed air stream by means of a second cooling liquid in a third heat exchanger (201*b*), resulting in a cooled mixed air stream saturated to a third level and a heated second cooling liquid.

21. Method according to claim 20, characterized by the fact that a fourth heat exchanger (19) receives the heated first cooling liquid and thereby heats the first portion of the water-containing substance before passing it to the first heat exchanger (1).

* * * * *